(12) United States Patent
Miyazawa et al.

(10) Patent No.: US 8,786,812 B2
(45) Date of Patent: Jul. 22, 2014

(54) LIQUID CRYSTAL DISPLAY DEVICE

(75) Inventors: Toshio Miyazawa, Chiba (JP); Terunori Saitou, Mobara (JP)

(73) Assignee: Japan Display Inc., Tokyo (JP)

( * ) Notice: Subject to any disclaimer, the term of this patent is extended or adjusted under 35 U.S.C. 154(b) by 79 days.

(21) Appl. No.: 13/414,048

(22) Filed: Mar. 7, 2012

(65) Prior Publication Data

US 2012/0242913 A1  Sep. 27, 2012

(30) Foreign Application Priority Data

Mar. 22, 2011 (JP) ................................ 2011-063331

(51) Int. Cl.
G02F 1/1343 (2006.01)
(52) U.S. Cl.
USPC ............................ 349/141; 349/142; 349/146
(58) Field of Classification Search
None
See application file for complete search history.

(56) References Cited

U.S. PATENT DOCUMENTS

| | | | |
|---|---|---|---|
| 5,493,427 A | 2/1996 | Nomura et al. | |
| 2006/0290869 A1* | 12/2006 | Suzuki | 349/143 |
| 2008/0266387 A1 | 10/2008 | Krijn et al. | |
| 2010/0149444 A1 | 6/2010 | Hikmet et al. | |
| 2010/0157181 A1 | 6/2010 | Takahashi | |
| 2011/0157495 A1* | 6/2011 | Kim et al. | 349/15 |

FOREIGN PATENT DOCUMENTS

| | | |
|---|---|---|
| JP | 2862462 | 12/1998 |
| JP | 2004-258631 | 9/2004 |
| JP | 2005-91743 | 4/2005 |
| JP | 2007-52323 | 3/2007 |
| JP | 2007-156390 | 6/2007 |
| JP | 2009-520231 | 5/2009 |

OTHER PUBLICATIONS

English translation of Office Action in corresponding Japanese Application No. 2011-063331, dated May 21, 2013.
English translation of Office Action in corresponding Japanese Application No. 2011-063331, dated Feb. 4, 2014.

* cited by examiner

Primary Examiner — Lucy Chien
(74) Attorney, Agent, or Firm — Antonelli, Terry, Stout & Kraus, LLP.

(57) ABSTRACT

A liquid crystal lens is provided on a liquid crystal display panel. Electrodes extending vertically to a plane of drawing are provided on an upper substrate of the liquid crystal lens at predetermined intervals. No electrodes are provided on a lower substrate. An initial alignment of liquid crystal molecules in the liquid crystal lens is vertically directed with respect to the plane of the drawing. A voltage applied to the upper substrate electrodes generates a transverse electric field to rotate the liquid crystal molecules. Polarization light emitted from the liquid crystal display panel is vertically directed to the plane of the drawing, which generates a refractive index distribution of the polarization light in a liquid crystal layer to form a convex lens within the liquid crystal lens. This lens allows first and second pixels to be recognized by right and left eyes to allow a three-dimensional display.

5 Claims, 9 Drawing Sheets

RUBBING DIRECTION ON LOWER SUBSTRATE
(POLARIZATION DIRECTION OF LCD EMISSION LIGHT)

RUBBING DIRECTION ON LOWER SUBSTRATE
(POLARIZATION DIRECTION OF LCD EMISSION LIGHT)

Y-Y LIQUID CRYSTAL LENS IN ON-STATE

Y-Y LIQUID CRYSTAL LENS IN OFF-STATE

X—X LIQUID CRYSTAL LENS IN ON-STATE

RUBBING DIRECTION ON LOWER SUBSTRATE (POLARIZATION DIRECTION OF LCD EMISSION LIGHT)

X-X LIQUID CRYSTAL LENS IN OFF-STATE

X-X LIQUID CRYSTAL LENS IN ON-STATE

Y-Y LIQUID CRYSTAL LENS IN OFF-STATE

Y-Y LIQUID CRYSTAL LENS IN ON-STATE

LIQUID CRYSTAL DISPLAY DEVICE

CLAIM OF PRIORITY

The present application claims priority from Japanese Patent Application JP 2011-063331 filed on Mar. 22, 2011, the content of which is hereby incorporated by reference into this application.

TECHNICAL FIELD

Background

The present invention relates to a display device, and more particularly, to a liquid crystal display device which allows a three-dimensional display using a liquid crystal lens.

A liquid crystal display panel includes a TFT substrate having pixel electrodes and thin film transistors (TFT) arranged in a matrix, and a counter substrate that is located opposite the TFT substrate, having color filters positioned corresponding to the pixel electrodes on the TFT substrate. A liquid crystal is interposed between the TFT substrate and the counter substrate to form a display region. An image is formed by controlling light transmittance through liquid crystal molecules for each pixel. Since the liquid crystal is capable of controlling only polarization light, a light ray from a backlight is polarized by a lower polarizer before incidence to the TFT substrate, and controlled by a liquid crystal layer. It is further polarized by an upper polarizer again so as to be emitted to the outside. So the light emitted from the liquid crystal display panel is polarization light.

Various methods for forming a three-dimensional image on the liquid crystal display panel have been proposed. Among all of those methods, one which provides the liquid crystal lens on the liquid crystal display panel has been focused on its application especially to a small-sized display device because of features that no special glasses are required for visual recognition of the three-dimensional image, and that selection between the two-dimensional image and the three-dimensional image may be performed.

Japanese Patent No. 2862462 discloses the structure in which a liquid crystal lens has liquid crystal molecules interposed between an upper substrate and a lower substrate, upper substrate electrode patterns are formed in stripes on the upper substrate, and flat solid lower substrate electrode patterns are formed on a lower substrate so that the lens is formed through alignment of the liquid crystal molecules along the electric field generated by applying voltage to both the upper and the lower substrate electrode patterns.

Japanese Unexamined Patent Application Publication No. 2009-520231 discloses a liquid crystal lens that uses an electric field generated by a longitudinal electric field between the upper substrate electrode pattern and the lower substrate electrode pattern. Those upper and the lower substrate electrode patterns on the upper and the lower substrates are similar, but they are rotated to form an angle of 90° with each other. This makes it possible to direct the lens to rotate at 90° through the method of applying the voltage to the upper and the lower substrate electrode patterns. In the case where a display screen is in both horizontal and vertical modes, the three-dimensional display may be performed.

FIGS. 11 and 12 schematically show a liquid crystal lens 10 and a 3D display using the liquid crystal lens 10. The terms 2D display and 3D display herein refer to the two-dimensional display and the three-dimensional display. The liquid crystal lens 10 has the same structure as the liquid crystal display element configured to interpose a liquid crystal between two substrates each with an electrode. However, it is not intended to be used for the control of polarization direction like the liquid crystal display, and accordingly, no polarizer is used.

FIG. 11 schematically shows the electrodes formed on the two substrates that interpose the liquid crystal. The electrode on the lower substrate 30 has a laterally long rectangular pattern as indicated by a solid line, and the electrode on the upper substrate 20 has a rectangular pattern as indicated by a dashed line. Rectangular boxes A and B denote electrode terminals that externally apply the voltage. The line which connects the electrode terminal with the electrode on the aforementioned substrate denotes a wiring. The electrode connected to the electrode terminal A may be designated as an electrode A, and the electrode connected to the electrode terminal B may be designated as an electrode B. Basically, each pattern of the upper and the lower substrates is not limited, and those patterns may be reversed with respect to the upper and the lower substrates. Transmission of light is required, and accordingly, the transparent electrode such as ITO is used for forming at least the electrode as shown by the dashed line, which covers the entire display portion.

Arrow P shown in FIG. 11 denotes a rubbing direction on the upper and the lower substrates. The liquid crystal interposed between those substrates is aligned to have a part at a longer axis side directed toward the arrow direction when the voltage is not applied. FIG. 12 is a sectional view taken along line Y-Y of FIG. 11. The electrode at the side of the lower substrate 30 is set so that two pixels in the LCD below the liquid crystal lens 10 are arranged between two electrodes. Actually, a pitch of the two pixels is not the same as that of the electrodes. Those pitches are appropriately designed in accordance with an assumed viewing position.

FIG. 12 illustrates a state where each voltage applied to the upper and the lower electrodes is set to be the same, that is, the voltage is not applied to the liquid crystal. In other words, the liquid crystal lens 10 is in an off-state. In this state, the liquid crystal is entirely in an alignment direction regulated through rubbing. The liquid crystal lens 10 as an optically uniform medium with respect to the transmitted light does not act so as to directly output the 2D image on the LCD for display.

FIG. 13 illustrates a state where the voltage is applied to the upper and lower electrodes of the liquid crystal lens 10 so as to change the alignment direction of the liquid crystal, that is, the liquid crystal lens 10 is in an on-state. Like the LCD, in a normal state, an AC voltage is applied for preventing deterioration in the liquid crystal. The electrode on the upper substrate 20 is solid, and the lower electrode locally exists. Therefore, the electric field applied to the liquid crystal is not uniform in the longitudinal and lateral directions. Along the radial (parabolic) electric field toward the upper solid electrode from the lower locally positioned electrode, the liquid crystal molecules are also radially aligned as shown in the drawing.

A liquid crystal molecule 50 exhibits a birefringent property. The component in the longitudinal direction (longer axis direction) of the molecule of polarization light of a transmitted beam is brought into extraordinary light with a high refractive index. The component perpendicular to the one in the longitudinal direction of the molecule is brought into ordinary light with a lower refractive index than that of the extraordinary light. The intervening angle may be obtained by resolving the component into the extraordinary light component and the ordinary light component in the same manner as vector resolution. The birefringent property refracts incident light to the lower substrate 30 as shown in FIG. 13. In other words, the liquid crystal lens 10 shown in FIG. 13 provides the optical property similar to that of the convex lens.

The polarizing direction 40 of the incident light, that is, the light emitted from a liquid crystal display panel 100 is substantially in parallel with the rubbing direction on the liquid crystal lens 10, the ratio between the portion with a high refractive index (extraordinary light) and the portion with a low refractive index upon passage of the incident light through the liquid crystal lens 10 varies by location. As FIGS. 11 and 12 show, the longer axis direction of the liquid crystal molecule 50 is consistent with the rubbing direction which determines an initial alignment of the liquid crystal.

Referring to FIG. 13, a dashed line representative of an interface of a convex lens 11 schematically shows the interface between the portion with a high refractive index and the portion with a low refractive index. The same effect as the one derived from the convex lens is obtained in the liquid crystal. When two pixels in the liquid crystal display panel 100 are provided under the effect of the convex lens as shown in FIG. 13, light rays from a first pixel 200 change the paths mainly to the right side, and light rays from a second pixel 300 change the paths mainly to the left side. Referring to FIG. 13, each of codes "r", "g" and "b" of the first pixel 200 and the second pixel 300 denotes a "red sub-pixel", a "green sub-pixel" and a "blue sub-pixel", respectively, common to all the pixels. In the condition where the liquid crystal lens 10 and the liquid crystal display panel 100 are appropriately designed so that signals for a right eye and a left eye are displayed on the first pixel 200 and the second pixel 300, the light from the first pixel 200 and the light from the second pixel 300 may be guided to the right eye and the left eye of an observer, respectively. This allows the observer to recognize the 3D image.

Meanwhile, on demand from recent use of the liquid crystal display device, the function capable of selectively displaying in the portrait mode (vertical display) and the landscape mode (horizontal display) has been added like a mobile phone. To cope with the demands from the usage, the 3D panel is required to have the function for selecting the display between the vertical and the horizontal modes. FIG. 14 shows an example of generally employed art which allows the liquid crystal lens 10 to selectively display in the vertical and the horizontal modes.

Like the case in FIG. 11, the solid line indicates lower substrate electrode patterns 31, and the dashed line indicates upper substrate electrode patterns 21. Each of the upper substrate 20 and the lower substrate 30 is formed of thin electrodes each as the local electrode and thick electrodes so as to be solid corresponding to the thin electrodes on the counter substrate. Codes "A", "B", "C" and "D" refer to the terminal electrodes for application of the voltage to the respective electrode patterns, and corresponding electrodes as well.

FIGS. 15 and 16 show sectional views each showing a state where the laterally extending cylindrical liquid crystal lens 10 as shown in FIG. 14 is formed. The consequence substantially the same as the one described referring to FIGS. 12 and 13 occurs so as to provide the function of the liquid crystal lens 10. The state shown in FIGS. 15 and 16 is different from the one shown in FIGS. 12 and 13 in that a transverse electric field is generated between the electrodes A and C as indicated by FIG. 16. This transverse electric field is directed substantially in the same direction as the rubbing direction, thus giving no fatal impact on the liquid crystal alignment and the lens effect.

FIGS. 17 and 18 are sectional views each taken along line X-X of FIG. 14. FIG. 17 shows the state where the voltage is not applied to the liquid crystal for 2D display. The liquid crystal molecules 50 each drawn as a circle in the drawing represents that the longer axis is longitudinally directed with respect to the upper electrode, that is, in the vertical direction with respect to a plane of the drawing. FIG. 18 shows the state where the voltage is applied so that the electric field is generated between the electrode B and the other electrodes A, C and D on the upper substrate 20. Like FIG. 13 or FIG. 16, the liquid crystal is aligned again along the radial electric field directed toward C from B so as to form a downward convex lens shape. The transverse electric field is simultaneously generated between the electrodes B and D on the upper substrate 20. The liquid crystal is also aligned again along this electric field.

SUMMARY OF THE INVENTION

In the course of observation that the transverse electric field not only disarranges the shape of the liquid crystal lens 10 but also causes the lens effect to disappear over a long time (owing to change in the liquid crystal domain) as experimental results, it is found to be difficult to put the above-described mode into practical use for selection of the display between the vertical and horizontal modes. The present invention provides a liquid crystal lens 10 applicable to various display modes including selection of the display between the vertical and horizontal modes.

Firstly, a liquid crystal lens is provided on a liquid crystal display panel provided with a first pixel and a second pixel. The liquid crystal lens is formed by interposing the liquid crystal between a first substrate and a second substrate. Electrodes in stripes are formed on the first substrate of the liquid crystal lens, which extend in a first direction, and are arranged in a second direction orthogonal to the first direction. No electrodes opposite those formed on the first substrate are formed on the second substrate.

The initial alignment of the liquid crystal is set to be in the same direction as that of the electrodes in stripes formed on the first substrate. The polarizing direction of the polarization light emitted from the liquid crystal display panel is set to be the same as that of the electrodes in stripes formed on the first substrate. Upon application of the voltage between electrodes in stripes formed on the first substrate, the transverse electric field is generated, along which the liquid crystal is rotated for alignment again. This may allow formation of the convex lens in the liquid crystal lens. The convex lens forms the three-dimensional image while allowing the first pixel to be recognized by the right eye and the second pixel to be recognized by the left eye.

Secondly, the liquid crystal display device is configured to allow selection of the display screen between a vertical mode and a horizontal mode. When electing the display screen in the horizontal mode, the generally employed liquid crystal lens of longitudinal electric field type is used. When selecting the display screen in the vertical mode, the liquid crystal lens of the transverse electric field type is used. This makes it possible to realize the three-dimensional liquid crystal display device using the liquid crystal lens, capable of selecting the display screen between the vertical mode and the horizontal mode. Conversely, the liquid crystal lens of transverse electric field type may be used for selecting the display screen in the horizontal mode, and the liquid crystal lens of longitudinal electric field type may be used for selecting the display screen in the vertical mode.

According to the present invention, the transverse electric field may be used as the liquid crystal lens, thus expanding the application of the liquid crystal lens of the liquid crystal display device. This makes it possible to realize the three-dimensional display using the liquid crystal lens in the liquid crystal display device capable of selecting the display screen between the vertical mode and the horizontal mode.

DESCRIPTION OF THE PREFERRED EMBODIMENTS

Figure 3:
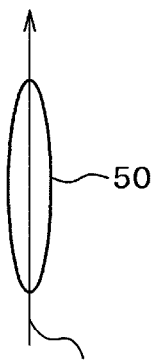
FIG. 3 is a schematic view showing a relationship between an initial alignment direction of a liquid crystal molecule and the polarization light.
Figure 4:
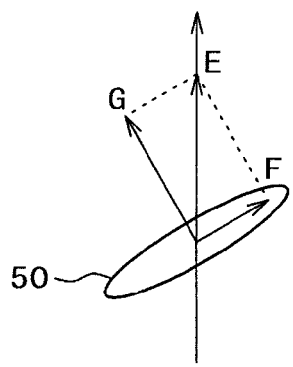
FIG. 4 is a schematic view showing a diagonal passage of the polarization light through the liquid crystal molecule.
Figure 5:
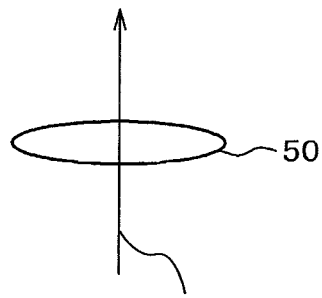
FIG. 5 is a schematic view showing a relationship between the liquid crystal molecule and the polarization light when a sufficiently high transverse electric field is applied to the liquid crystal molecule.

FIGS. 3, 4 and 5 show a relationship between the liquid crystal and the transmitted light polarizing direction 40. Referring to FIG. 3, the polarizing direction 40 is consistent with the longer axis direction of the liquid crystal molecule 50. At this time, the liquid crystal works as a high refractive index medium with respect to the transmitted light. Referring to FIG. 5, the polarizing direction 40 is orthogonal to the longer axis direction of the liquid crystal molecule 50. Then the liquid crystal works as a low refractive index medium with respect to the transmitted light. FIG. 4 represents an intermediate state between those shown in FIGS. 3 and 5. Supposing that intensity of the incident polarization light is expressed as vector OE, and resolved components of the vector OE corresponding to the longer axis direction of the liquid crystal molecule 50 and corresponding to the direction vertical to the longer axis direction are designated with OF and OG, the OF passes through the high refractive index medium, and the OG propagates in the liquid crystal while passing through the low refractive index medium. The transverse electric field may cause the distribution of the refractive index in the liquid crystal. It is therefore possible to form the liquid crystal lens 10 under the transverse electric field. The present invention will be described in detail in reference to the examples.

Example 1

Figure 1:
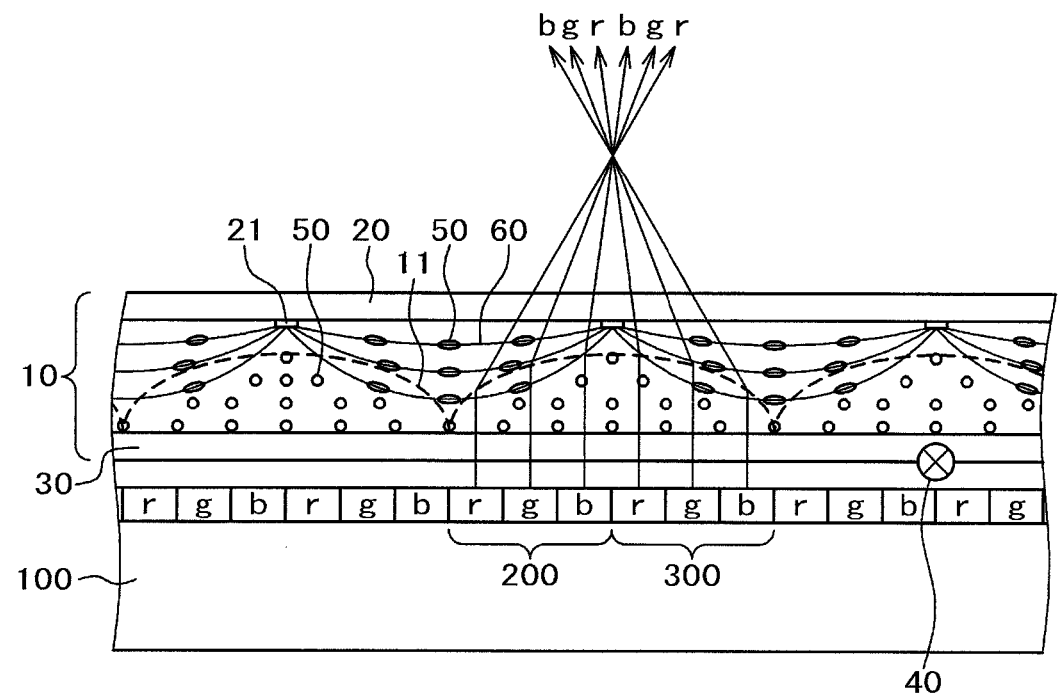
FIG. 1 is a sectional view representing a three-dimensional display using a liquid crystal lens of transverse electric field type.

FIG. 1 is a sectional view of the liquid crystal display device which includes the liquid crystal lens 10 according to Example 1. Referring to the liquid crystal lens 10 shown in FIG. 1, the liquid crystal is interposed between the upper substrate 20 and the lower substrate 30. The liquid crystal display panel 100 is provided below the liquid crystal lens 10. The liquid crystal display panel 100 is illustrated in a simplified manner in FIG. 1, while specifying an arrangement of red sub-pixels r, green sub-pixels g, and blue sub-pixels b. A backlight (not shown) is provided below the liquid crystal display panel 100. A light ray from the backlight is polarized by the lower polarizer of the liquid crystal display panel 100, modulated by the liquid crystal in the liquid crystal display panel 100, and polarized by the upper polarizer of the liquid crystal display panel 100 again so as to be emitted toward the liquid crystal lens 10.

Figure 2:
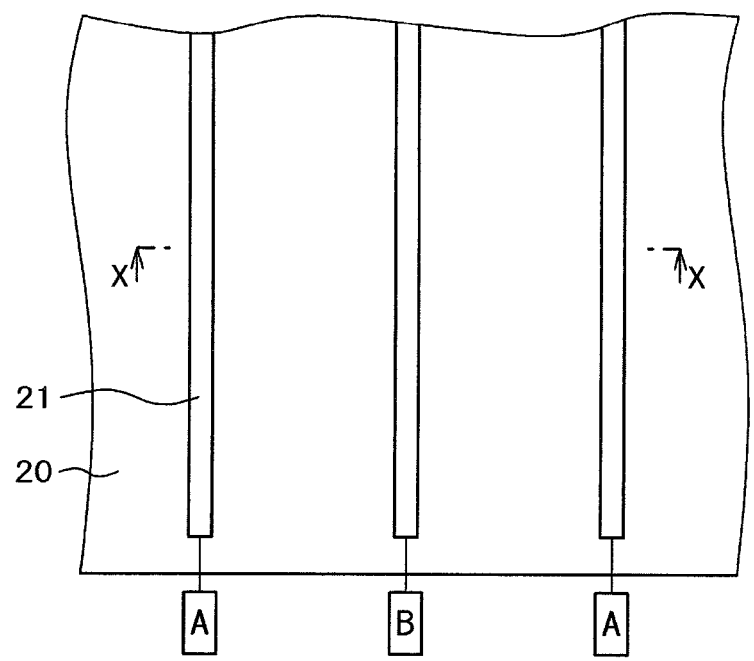
FIG. 2 is a plan view of an upper substrate of the liquid crystal lens shown in FIG. 1.

The light emitted from the liquid crystal display panel 100 is linearly polarized in the vertical direction with respect to the plane of the drawing as the emission polarization direction 40 shows. The liquid crystal lens 10 acts on the linearly polarized light. FIG. 2 is a plan view of the upper substrate 20 of the liquid crystal lens 10 shown in FIG. 1. FIG. 1 is a sectional view taken along line X-X of FIG. 2. Referring to FIGS. 1 and 2, upper substrate electrode patterns 21 are arranged in stripes at predetermined intervals on the upper substrate 20.

When the voltage is not applied between the electrodes, the liquid crystal molecules 50 are aligned in the direction vertical to the plane of the drawing in FIG. 1, that is, in the extending direction of the electrodes in stripes as shown in FIG. 2. That is, the rubbing direction which determines the initial alignment of the liquid crystal lens 10 is consistent with the extending direction of the electrodes in stripes as shown in FIG. 2. Preferably, the rubbing direction is consistent with the extending direction of the electrodes in stripes within a range of ±5°. In this state, when the polarization light passes through the liquid crystal lens 10, it is expected to pass through the high refractive index medium because the polarizing direction 40 is consistent with the longer axis direction of the liquid crystal molecule 50. Since the polarization light passes through the uniform medium, the traveling direction is not changed.

When applying the voltage between the electrodes A and B, the transverse electric field in parallel with the substrate is generated as shown in FIG. 1 because of no electrodes are formed on the lower substrate 30. The liquid crystal molecules 50 are rotated along the thus generated electric field, and aligned as shown in FIG. 1. The light that has passed through the medium at locations each with a different refractive index may be refracted. The polarization light emitted from the liquid crystal display panel 100 is refracted between the liquid crystal molecule 50 arranged under the influence of the transverse electric field and the liquid crystal molecule 50 under no influence of the transverse electric field.

Referring to FIG. 1, the liquid crystal molecules 50 just above the upper substrate electrode pattern 21 are not influenced by the transverse electric field, and are not rotated up to the position around the upper substrate 20, thus maintaining the initial alignment consistent with the rubbing direction. Meanwhile, the liquid crystal molecules 50 at an intermediate position between the upper substrate electrode patterns 21 is influenced most by the transverse electric field, and the liquid crystal rotates laterally. The thus laterally rotated liquid crystal molecules 50 act as the low refractive index medium with respect to the polarization light in the direction shown in FIG. 1, as described referring to FIGS. 3 to 5.

In the state of the liquid crystal layer where the voltage is applied to the upper substrate electrode patterns 21, a convex lens 11 as indicated by a dashed line of FIG. 1 is formed with respect to the polarization light shown in FIG. 1. Referring to FIG. 1, the polarization lights emitted from the sub-pixels of the liquid crystal display panel 100 are caused to change their paths by an action of the convex lens 11 formed in the liquid crystal lens 10. In other words, the first pixel 200 changes the path to the right and the second pixel 300 changes the path to the left so that the first pixel 200 and the second pixel 300 are recognized by right and left eyes, respectively. Different signals are input to the first pixel 200 and the second pixel 300 so as to produce the three-dimensional image.

The AC voltage is applied between the electrodes A and B. An electric force line 60 has its direction cyclically changed. The direction of the liquid crystal molecule 50 is influenced by the effective value of the electric field, and accordingly, there is no change in the alignment direction of the liquid crystal molecule 50. In the aforementioned explanation, the electrodes are arranged in stripes on the upper substrate 20, and no electrodes are provided on the lower substrate 30. However, it is possible to form the convex lens 11 in the structure having the electrodes arranged in stripes on the lower substrate 30 and no electrodes on the upper substrate 20.

In Example 1, each of the first pixel 200 and the second pixel 300 includes red sub-pixels r, green sub-pixels g, and blue sub-pixels b. However, colors or the number of the sub-pixels are not limited to the aforementioned structures but may be arbitrarily changed.

Example 2

This example provides the liquid crystal display device capable of selecting the display screen between vertical mode and horizontal mode using the liquid crystal lens 10. In the liquid crystal lens 10, the electric field generated by the electrode between the upper substrate electrode pattern 21 and the lower substrate electrode pattern 31 is designated as a longitudinal electric field, and the electric field generated only by the upper substrate electrode pattern 21 or the lower substrate electrode pattern 31 is designated as the transverse electric field. This example uses the liquid crystal lens 10 formed under the longitudinal electric field for one of the vertical mode and the horizontal mode, and the liquid crystal lens 10 formed under the transverse electric field for the other mode.

Figure 6:
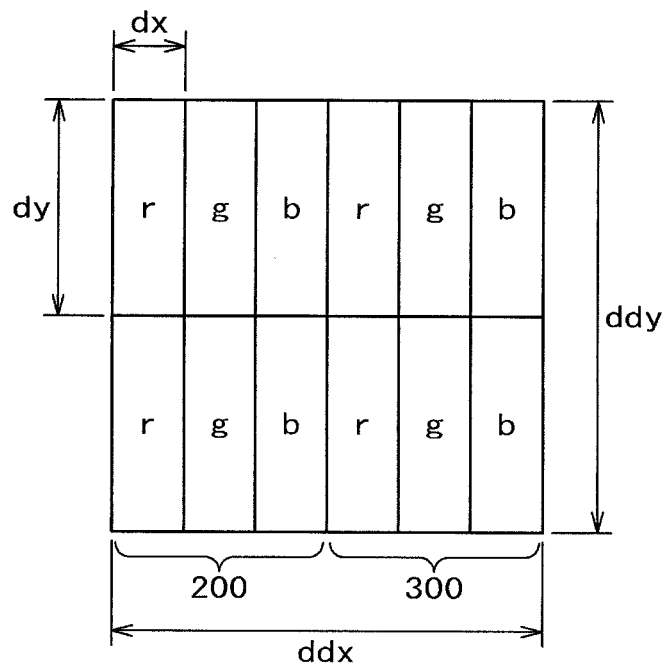
FIG. 6 is a plan view showing a pixel structure in a liquid crystal display panel.

FIG. 6 is a plan view which represents the pixel structure in the liquid crystal display panel 100. Referring to FIG. 6, each of the first pixel 200 and the second pixel 300 includes the sub-pixels r, g and b in the lateral direction. The same pixels are arranged in the longitudinal direction. Each size of short diameter dx and long diameter dy of the sub-pixel may be set to 25 μm and 75 μm respectively, for example. In the horizontal mode, the liquid crystal lens 10 covers two pixels ddx in the lateral direction using the single convex lens 11. In the vertical mode, the single convex lens 11 covers two pixels ddy in the longitudinal direction. Generally, each dimension of ddx and ddy is the same. However, those dimensions may be different.

Figure 7:
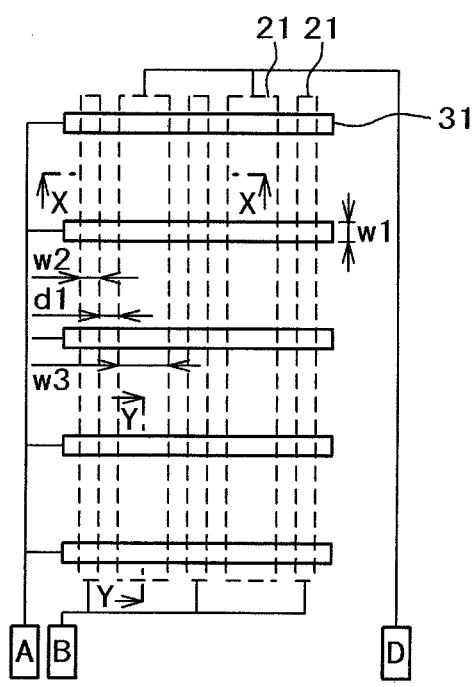
FIG. 7 is a plan view showing an arrangement of electrodes of the liquid crystal lens according to Example 2.

FIG. 7 is a plan view showing the lower substrate electrode patterns 31 and the upper substrate electrode pattern 21 according to the example. The lower substrate electrode patterns 31 indicated by the solid line, that is, the electrodes A extend laterally, and are longitudinally arranged in stripes at predetermined intervals. The lower substrate electrode pattern 31, that is, the electrode A has a width w1 of approximately 10 μm. The interval between the lower substrate electrode patterns 31, that is, the electrodes A is set to the value corresponding to two pixels as shown in FIG. 6, for example, 150 μm so as to cover the ddy shown in FIG. 6.

The upper substrate electrode patterns 21 indicated by the dashed line shown in FIG. 7 include the narrow electrode B and the wide electrodes D. The distance between centers of the narrow electrodes B is set to the value corresponding to two pixels, for example, 150 μm, which covers the ddx shown in FIG. 6. An interval d1 between the wide electrode D and the narrow electrode B is set to approximately 5 μm. The width w3 of the wide electrode D is set to 130 μm, for example.

As described referring to FIG. 6, each of the dimensions ddx and ddy may be equivalent or different. The interval between the electrodes B on the upper substrate 20, and the interval between the electrodes A on the lower substrate 30 may vary accordingly. The interval between the electrodes B on the upper substrate covers the ddx, but is not necessarily consistent with the dimension ddx. On the lower substrate, the interval between the electrodes A covers the ddy, but is not necessarily consistent with the ddy.

Referring to FIG. 7, the rubbing direction, that is, the initial alignment direction of the liquid crystal molecule 50 is the same as the extending direction of the upper substrate electrode pattern 21. The "same direction" does not necessarily mean "full matching". There may be the case where such direction is made slightly different from the extending direction of the upper substrate electrode pattern 21 to prevent occurrence of domain. Preferably, the extending direction of the upper substrate electrode pattern 21 is consistent with that of the rubbing direction that determines the initial alignment of the liquid crystal molecule 50 within a range of ±5°. Referring to FIG. 7, it is possible to apply different voltages to the electrodes A, B and D, respectively.

Figure 8:
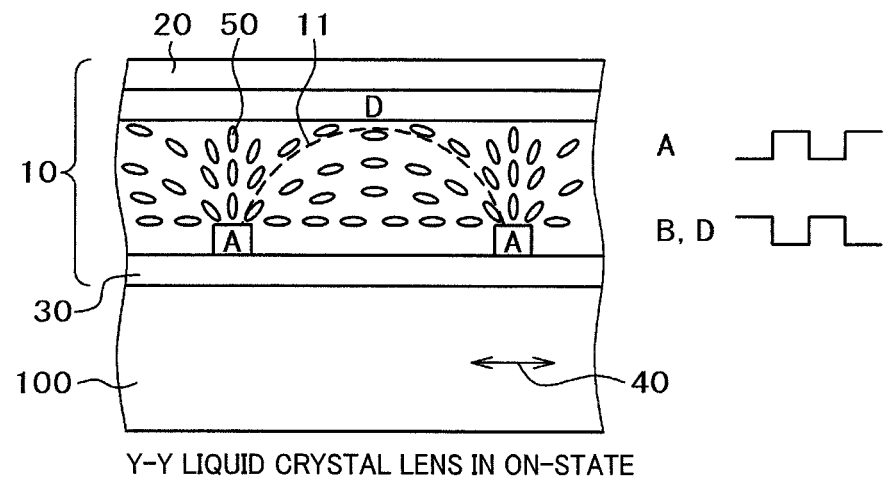
FIG. 8 is a sectional view showing the liquid crystal lens using a longitudinal electric field according to Example 2.

FIG. 8 is a sectional view taken along line Y-Y of FIG. 7, which represents the case where the display is used in a horizontal mode. Specifically, FIG. 8 is a sectional view showing alignment of the liquid crystal molecules 50 when applying the voltage different from those applied to the electrodes B and D to the electrode A as indicated by FIG. 7. Referring to FIG. 8, the polarizing direction 40 of the polarization light emitted from the liquid crystal display panel 100 is in parallel with the plane of the drawing as indicated by the arrow. Referring to the sectional view taken along line Y-Y, the upper substrate electrode patterns 21 are formed as a continuous pattern. The liquid crystal molecules 50 are aligned under the electric field generated between the electrodes in stripes as the lower substrate electrode patterns 31 and the upper substrate electrode patterns 21.

Figure 12:
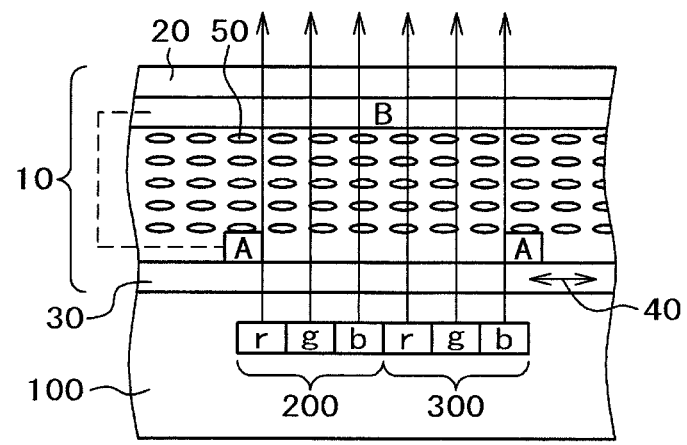
FIG. 12 represents an example of usage as a two-dimensional display device without forming a lens in the liquid crystal lens.
Figure 13:
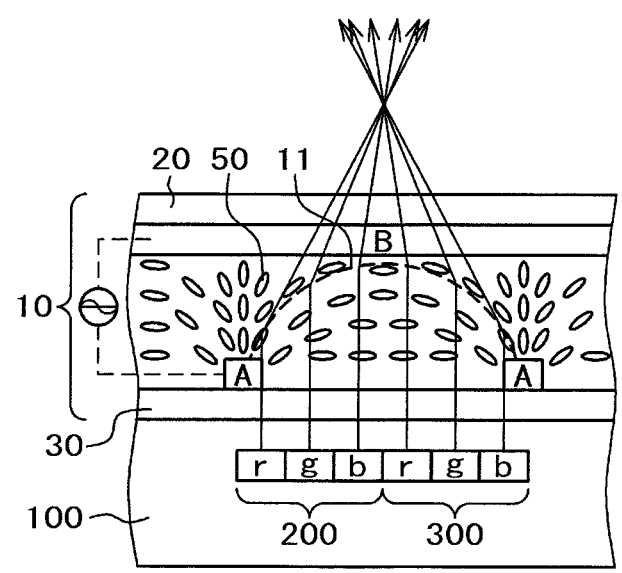
FIG. 13 is a sectional view representing formation of the convex lens in the liquid crystal lens using the longitudinal electric field.
Figure 14:
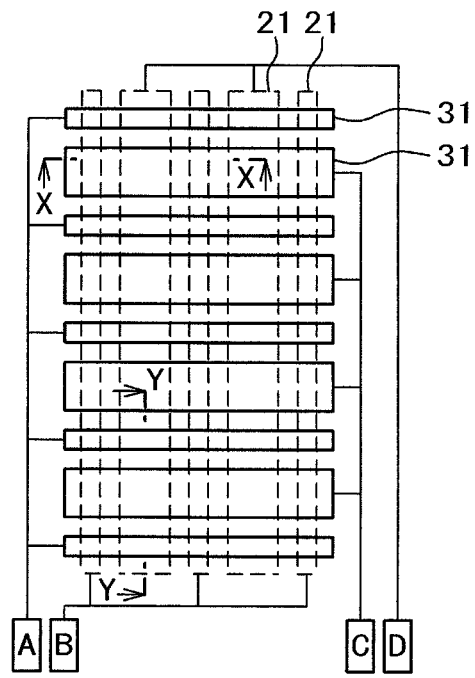
FIG. 14 is a plan view showing an arrangement of electrodes of the liquid crystal lens as related art so as to select a display screen between a vertical mode and a horizontal mode.
Figure 15:
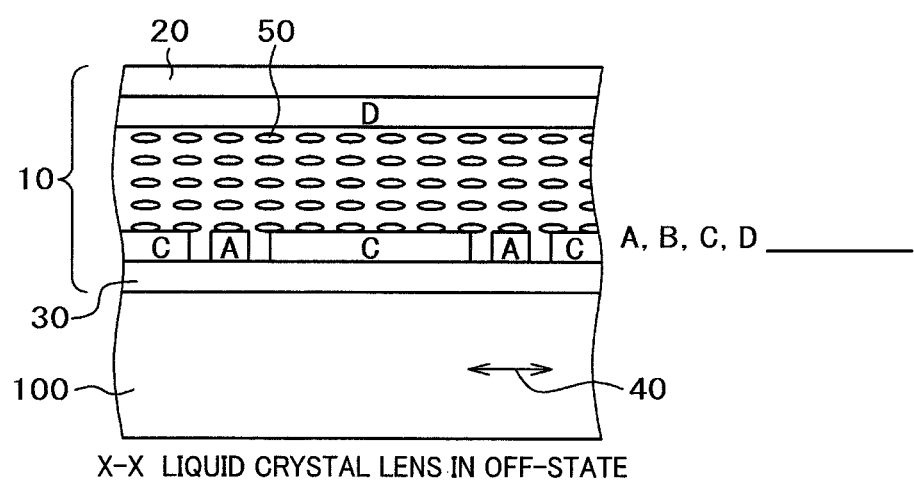
FIG. 15 is a sectional view of the liquid crystal display device shown in FIG. 14 when the vertical mode is selected, and the two-dimensional display is performed without applying the voltage to the respective electrodes.
Figure 16:
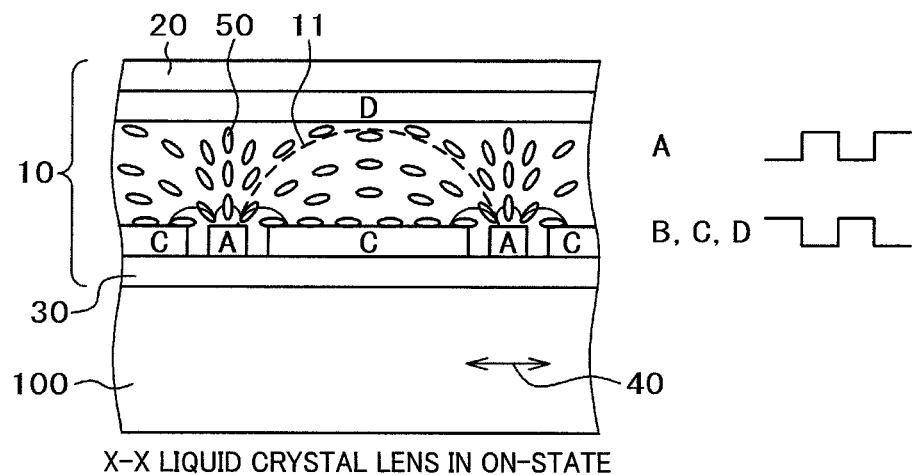
FIG. 16 is a sectional view of the liquid crystal display device shown in FIG. 14 when the vertical mode is selected, and the three-dimensional display is performed by applying the voltage to the respective electrodes.
Figure 17:
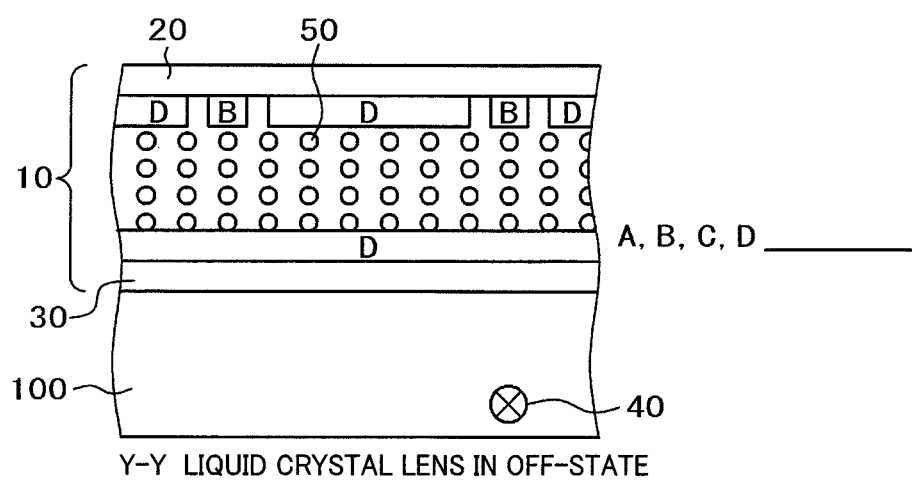
FIG. 17 is a sectional view of the liquid crystal display device shown in FIG. 14 when the horizontal mode is selected, and the two-dimensional display is performed without applying the voltage to the respective electrodes.
Figure 18:
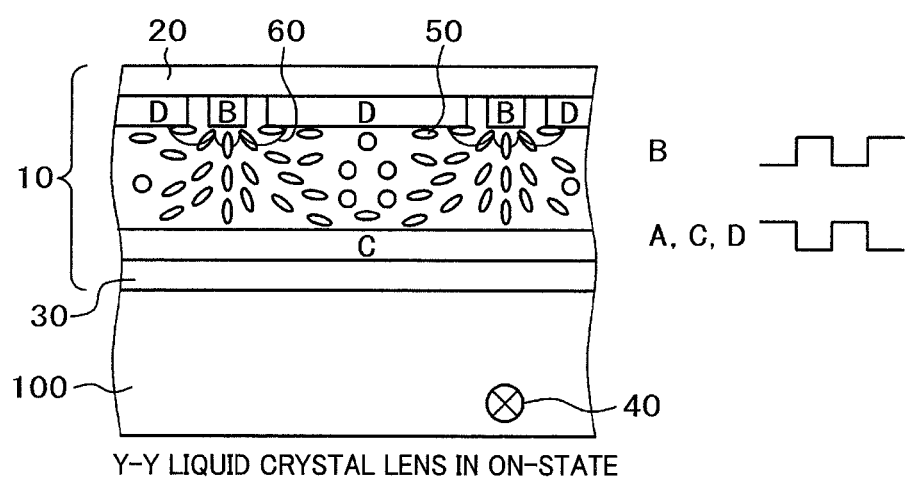
FIG. 18 is a sectional view of the liquid crystal display device shown in FIG. 14 when the horizontal mode is selected, and the three-dimensional display is performed by applying the voltage to the respective electrodes.

As the polarizing direction of light emitted from the liquid crystal display panel 100 is in parallel with the plane of the drawing, the convex lens 11 as indicated by the dashed line in FIG. 8 is formed with respect to the polarization light in the liquid crystal lens 10. The operation of the lens is similar to the one described referring to FIG. 13. When using the display screen in horizontal mode, the longitudinal electric field is generated between the upper substrate electrode patterns 21 and the lower substrate electrode patterns 31 to form the convex lens 11, thus allowing the three-dimensional image display. The alignment direction of the liquid crystal molecule 50 when no voltage is applied between the upper substrate electrode patterns 21 and the lower substrate electrode patterns 31 is similar to the case as described referring to FIG. 12. In this case, the convex lens 11 is not formed so as to perform the normal two-dimensional image display.

Figure 9:
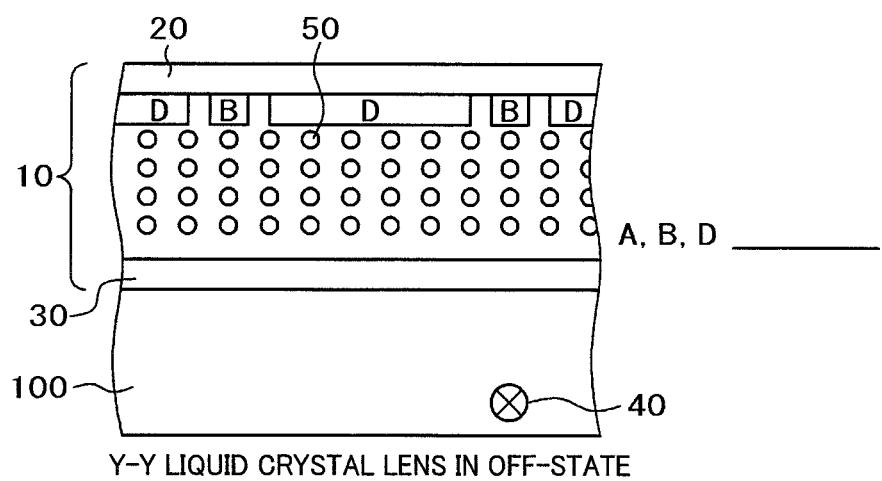
FIG. 9 is a sectional view showing a state where the liquid crystal display device is used as a two-dimensional display device without applying the voltage between the electrodes according to Example 2.
Figure 10:
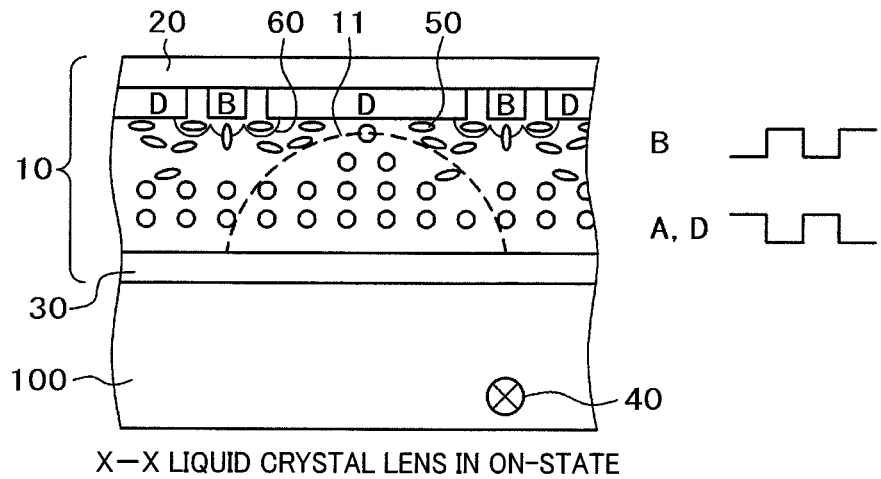
FIG. 10 is a sectional view of the liquid crystal display device according to Example 2, which forms a convex lens using the transverse electric field for three-dimensional display.
Figure 11:
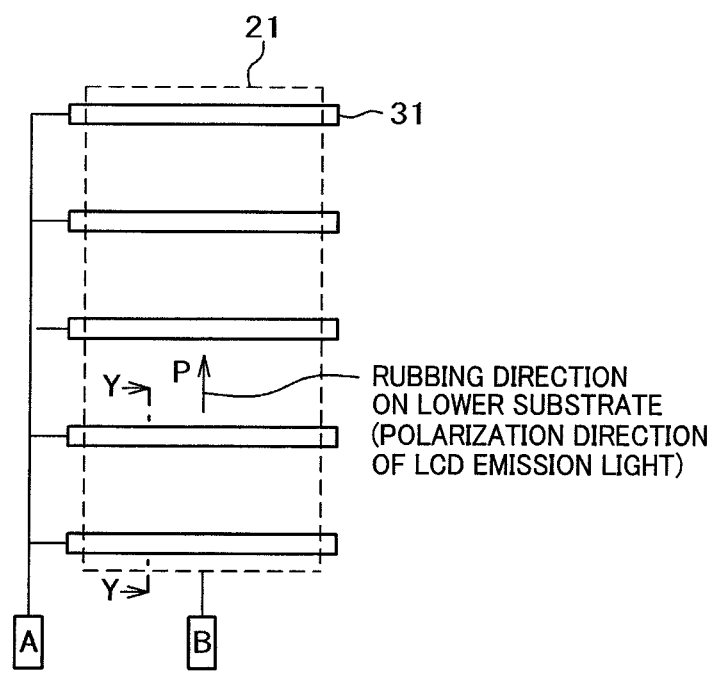
FIG. 11 is a plan view showing an arrangement of electrodes of the liquid crystal lens in a three-dimensional liquid crystal display device of longitudinal electric field type.

Each of FIGS. 9 and 10 is a sectional view taken along line X-X of FIG. 7, which represents the operation when using the display screen in vertical mode. Referring to FIGS. 9 and 10, the narrow electrodes B and the wide electrodes D extend in the vertical direction with respect to the plane of the drawing on the upper substrate 20. There are no electrodes arranged on the lower substrate 30. Referring to FIG. 9, since the voltage is not applied between the respective electrodes of the liquid crystal lens 10, the liquid crystal molecule 50 is kept in the initial alignment by rubbing. In this case, the display screen is used for displaying the two-dimensional image.

FIG. 10 is a sectional view which illustrates the operation of the liquid crystal lens 10 when applying voltage different from those applied to the electrodes A and D to the electrode B. Referring to FIG. 10, the transverse electric field is generated between the electrodes B, and those of A and D. The transverse electric field rotates the liquid crystal molecules 50 at the upper electrode side. Then those molecules are aligned in parallel with the plane of the drawing as FIG. 10 shows. The light emitted from the liquid crystal display panel 100 is polarized vertically with respect to the plane of the drawing. The aforementioned polarization light is not influenced by the transverse electric field. In other words, the liquid crystal molecule 50 that is not rotated under the electric field exhibits a higher refractive index than that of the liquid crystal molecule 50 rotated under the influence of the transverse electric field. Then the convex lens 11 as shown in FIG. 10 is formed in the liquid crystal layer.

The first pixel 200 and the second pixel 300 (not shown) are arranged between the electrodes B. The first pixels 200 are recognized by the right eye, and the second pixels 300 are recognized by the left eye so as to form the three-dimensional image. When using the display screen in the vertical mode, the three-dimensional image is formed by the liquid crystal lens 10 under the transverse electric field.

When the convex lens 11 is formed under the transverse electric field, the longitudinal electric field is generated between the electrodes A and B as shown in FIG. 7. The longitudinal electric field may disturb the lens under the transverse electric field. However, since the area overlapped between the electrodes A and B is very small as shown in FIG. 7, the influence on the image is limited even if the domain is formed at that part. Such influence may further be reduced by decreasing the width of the overlapped part between the electrodes A and B.

The convex lens 11 may be formed to generate the 3-D image if the upper substrate electrode patterns 21 and the lower substrate electrode patterns 31 are arranged on the lower and the upper electrodes in an inverted manner. Selective use of the longitudinal electric field and the transverse electric field in the liquid crystal lens 10 allows switching of the display screen between the vertical mode and the horizontal mode. This makes it possible to realize the liquid crystal display device capable of selecting the display screen between the vertical mode and the horizontal mode while selectively using the longitudinal and transverse electric fields in the liquid crystal lens 10.

According to Examples 1 and 2, the interval between the upper substrate 20 and the lower substrate 30 of the liquid crystal lens 10, that is, the thickness of the liquid crystal layer is equal to or smaller than half the lens diameter of the convex lens 11 to be formed, for example, 75 μm or smaller. Meanwhile, if the liquid crystal layer has a larger thickness, the response speed of the liquid crystal lens 10 may be reduced. Preferably, the interval between the upper substrate 20 and the lower substrate 30 for the liquid crystal lens 10 is as small as possible within the range which substantially allows formation of the convex lens.

What is claimed is:

1. A liquid crystal display device having a liquid crystal lens arranged on a liquid crystal display panel,
wherein the liquid crystal display panel includes pixels each having a red sub-pixel, a green sub-pixel, and a blue sub-pixel arranged in a first direction, which are provided in the first direction at first intervals, and further arranged in a second direction orthogonal to the first direction at second intervals;
the liquid crystal lens is formed by interposing a liquid crystal between a first substrate and a second substrate;
the first substrate includes a plurality of first electrodes in stripes, extending in the first direction, and arranged in the second direction each at an interval twice as large as the second interval, each of the plurality of first electrodes in stripes having a same width;
the second substrate includes a plurality of second electrodes in stripes and a plurality of third electrodes in stripes, extending in the second direction, and arranged in the first direction at predetermined intervals, having the plurality of second electrodes arranged in the first direction at the interval at least twice as large as the first interval, each of the plurality of third electrodes in stripes having a width greater than a width of each of the plurality of second electrodes in stripes;
an initial alignment of liquid crystal molecules between the first and second substrates is in the second direction; and
different voltages are allowed to be applied to the plurality of first, second and third electrodes.

2. The liquid crystal display device according to claim 1, wherein a direction of the initial alignment of the liquid crystal molecules in the liquid crystal lens is consistent with an extending direction of the plurality of first electrodes within a range of ±5°.

3. The liquid crystal display device according to claim 1, wherein the first substrate is positioned at a side of the liquid crystal display panel.

4. A liquid crystal display device having a liquid crystal lens arranged on a liquid crystal display panel,
wherein the liquid crystal display panel includes pixels each having a red sub-pixel, a green sub-pixel, and a blue sub-pixel arranged in a first direction, which are provided in the first direction at first intervals, and further arranged in a second direction orthogonal to the first direction at second intervals;

the liquid crystal lens is formed by interposing a liquid crystal between a first substrate and a second substrate;

the first substrate includes a plurality of first electrodes in stripes, extending in the first direction, and arranged in the second direction each at an interval twice as large as the second interval, each of the plurality of first electrodes in stripes having a same width;

the second substrate includes a plurality of second electrodes in stripes and a plurality of third electrodes in stripes, extending in the second direction, and arranged in the first direction at predetermined intervals, having the plurality of second electrodes arranged in the first direction at the interval twice as large as the first interval, each of the plurality of third electrodes in stripes having a width greater than a width of each of the plurality of second electrodes in stripes;

an initial alignment of liquid crystal molecules between the first and second substrates is in the second direction;

the plurality of second and the plurality of third electrodes are set to be at one potential, and a voltage is applied between the plurality of second electrodes and the plurality of first electrodes, and between the plurality of third electrodes and the plurality of first electrodes to allow a three-dimensional display; and the plurality of first electrodes and the plurality of third electrodes are set to be at the one potential, and the voltage is applied between the plurality of first electrodes and the plurality of second electrodes, and between the third and second electrodes to allow a three-dimensional display.

5. The liquid crystal display device according to claim 4, wherein a rectangular display screen is provided;

the plurality of second and third electrodes are set to be at the one potential, and the voltage is applied between the plurality of second and first electrodes, and between the plurality of third and first electrodes to perform the three-dimensional display by selecting the display screen in a horizontal mode; and the plurality of first and third electrodes are set to be at the one potential, and the voltage is applied between the plurality of first and second electrodes, and between the plurality of third and second electrodes to perform the three-dimensional display by selecting the display screen in a vertical mode.

* * * * *